(12) United States Patent
Karaoguz et al.

(10) Patent No.: US 9,232,567 B2
(45) Date of Patent: Jan. 5, 2016

(54) MOBILE HANDOFF THROUGH MULTI-NETWORK SIMULCASTING

(75) Inventors: Jeyhan Karaoguz, Irvine, CA (US); James D. Bennett, San Clemente, CA (US); Nambirajan Sashadri, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 480 days.

(21) Appl. No.: 13/612,121

(22) Filed: Sep. 12, 2012

(65) Prior Publication Data

US 2013/0034083 A1 Feb. 7, 2013

Related U.S. Application Data

(63) Continuation of application No. 11/093,906, filed on Mar. 30, 2005, now Pat. No. 8,290,498.

(60) Provisional application No. 60/591,735, filed on Jul. 28, 2004, provisional application No. 60/591,847, filed on Jul. 28, 2004, provisional application No. 60/591,844, filed on Jul. 28, 2004, provisional application No. 60/591,841, filed on Jul. 28, 2004, provisional application No. 60/591,845, filed on Jul. 28, 2004, provisional application No. 60/591,843, filed on Jul. 28, 2004, provisional application No. 60/591,842, filed on Jul. 28, 2004.

(51) Int. Cl.
*H04W 36/00* (2009.01)
*H04W 88/16* (2009.01)
*H04L 29/06* (2006.01)
*H04N 21/41* (2011.01)
*H04W 36/14* (2009.01)
*H04W 76/02* (2009.01)
*H04W 84/18* (2009.01)
*H04W 92/02* (2009.01)

(52) U.S. Cl.
CPC ......... *H04W 88/16* (2013.01); *H04L 29/06027* (2013.01); *H04L 65/1043* (2013.01); *H04N 21/4126* (2013.01); *H04W 36/14* (2013.01); *H04W 76/02* (2013.01); *H04W 84/18* (2013.01); *H04W 92/02* (2013.01)

(58) Field of Classification Search
CPC .................................................... H04W 76/02
USPC .......................................................... 455/444
See application file for complete search history.

(56) References Cited

U.S. PATENT DOCUMENTS

2002/0021465 A1 2/2002 Moore et al.
2002/0147008 A1* 10/2002 Kallio ........................... 455/426

(Continued)

FOREIGN PATENT DOCUMENTS

EP 1 587 290 A2 10/2005

OTHER PUBLICATIONS

Salkintzis A.K. et al.: "WLAN-GPRS Integration for Next-Generation Mobile Data Networks", IEEE Wireless Communications. IEEE Service Center, Piscataway, NJ, USA, vol. 9, No. 5, Oct. 2002, pp. 112-123, XP001132263 ISSN: 1070-9916.

(Continued)

*Primary Examiner* — Mazda Sabouri
(74) *Attorney, Agent, or Firm* — Brinks Gilson & Lione (57) ABSTRACT

A method and apparatus supporting handoff using simulcasting of multimedia information via a gateway are disclosed. A gateway supporting both a personal area network and a broadband network may receive multimedia information transmitted to an access device by a wide area network. The gateway may send the received multimedia information to the associated access device, and may communicate with the wide area network.

20 Claims, 4 Drawing Sheets

(56) References Cited

U.S. PATENT DOCUMENTS

| | | |
|---|---|---|
| 2002/0147014 A1 | 10/2002 | Atarius et al. |
| 2003/0104809 A1 | 6/2003 | Godshaw et al. |
| 2003/0152055 A1 | 8/2003 | Aragones et al. |
| 2003/0193910 A1 | 10/2003 | Shoaib et al. |
| 2004/0028009 A1 | 2/2004 | Dorenbosch et al. |
| 2004/0068571 A1 | 4/2004 | Ahmavaara |
| 2004/0160930 A1 | 8/2004 | Choi et al. |
| 2005/0007984 A1 | 1/2005 | Shaheen et al. |
| 2005/0025164 A1 | 2/2005 | Kavanagh et al. |
| 2005/0070288 A1 | 3/2005 | Belkin et al. |
| 2005/0181776 A1 | 8/2005 | Verma et al. |
| 2005/0226185 A1 | 10/2005 | Tell et al. |
| 2006/0126590 A1 | 6/2006 | Putcha et al. |
| 2010/0056186 A1 | 3/2010 | Hicks, III et al. |
| 2011/0032904 A1 | 2/2011 | Morales et al. |

OTHER PUBLICATIONS

European Search Report for S.N. 05009152.9-2416, Dated Nov. 18, 2005.

* cited by examiner

MOBILE HANDOFF THROUGH MULTI-NETWORK SIMULCASTING

RELATED APPLICATIONS

This application is a continuation of U.S. patent application Ser. No. 11/093,906, filed Mar. 30, 2005 entitled "Mobile Handoff Through Multi-Network Simulcasting" and makes reference to, claims priority to, and claims the benefit of the following United States Provisional Patent Applications, the complete subject matter of each of which is hereby incorporated herein by reference, in its entirety.

| Ser. No. | Attorney Docket No. | Title | Date Filed |
|---|---|---|---|
| 60/591,735 | 15884US01 BP3837 | Method and System for Handoff Through Simulcasting | Jul. 28, 2004 |
| 60/591,847 | 15885US01 BP3838 | Method and System for Handling Calls Through Simulcasting | Jul. 28, 2004 |
| 60/591,844 | 15886US01 BP3839 | Method and System for Handling Multimedia Information Through Simulcasting | Jul. 28, 2004 |
| 60/591,841 | 15887US01 BP3840 | Method and System for Simulcasting or Multicasting Multimedia Information in a Broadband Wired and/or Wireless LAN or Personal Area Network (PAN) Via a Broadband Access Gateway | Jul. 28, 2004 |
| 60/591,845 | 15888US0 I BP3841 | Method and System for Consuming Simulcasted and Multicasted Content in a PAN/WAN/WLAN Serviced by a Broadband Access Gateway | Jul. 28, 2004 |
| 60/591,843 | 15889US01 BP3842 | Method and System for Handoff of a Multimedia Stream by Sniffing | Jul. 28, 2004 |
| 60/591,842 | 15890US0I BP3843 | Method and System for Sniffing to Provide Association with a New Network | Jul. 28, 2004 |

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

Handoff from a cellular network to a home network such as a personal area network (PAN) and/or wireless local area network (WLAN) requires creation of an association with the PAN/WLAN and dissociating from the cellular network. This requires sending information between the mobile access device and the cellular network, between the cellular network and the PAN/WLAN, and between the PAN/WLAN the mobile access device. Although information sent between the cellular network, PAN/WLAN and a single mobile access device may be insufficient to affect system performance, in the aggregate, system performance may be negatively impacted.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method supporting handoff of at least one access device between a wide area network and one of: a personal area network and a wireless local area network using simulcasting of multimedia information, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the present invention relate to communication over a hybrid wired and wireless networks. More specifically, certain embodiments of the present invention relate to a method and system for handoff through simulcasting of wireless network traffic for an active subscriber from a wireless service provider servicing the active subscriber to a broadband wired and/or a wireless local area network (WLAN), and/or personal area network (PAN) using a broadband access gateway.

An aspect of the present invention provides also seamless merging of wide area networks (WANs), from any kind of wired and/or wireless wide area networks, to pockets of wired and/or wireless local area networks (WLANs) and personal area network (PANs), which may be located in homes or other environment such as an office or business. The merging of these various types of networks enables transparent communication of all types of media between access devices, which may be wired or wirelessly coupled to one or more of these networks. Seamless communication may be provided to access devices as they transition from one type of network to another type of network.

Figure 1:
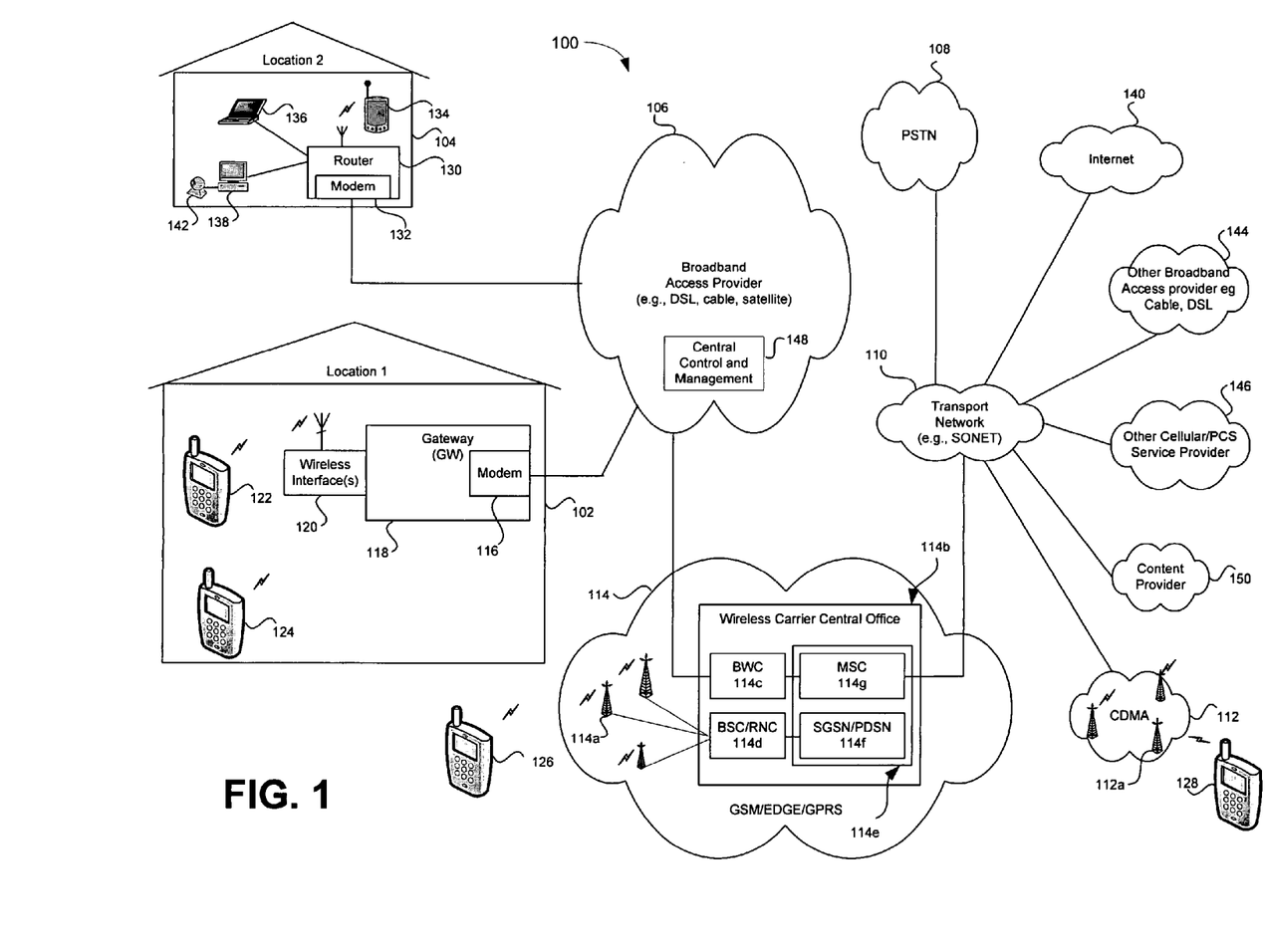
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, a public switched telephone network (PSTN) 108, a transport network 110, wireless service provider networks including a CDMA network 112 and a GSM network 114, and access devices 122, 124, 126, and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11 a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11 a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning, service management, and accounting. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM networks 112, 114 may comprise a plurality of cell sites (a/k/a cellular towers) that are located in geographical cells within each of the networks. Within the GSM network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM network 114 towards the wireless interface 120 in the first location 102, the call may be handed off from the cell site 114a of the GSM network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM network 114 via the broadband connection to the BAP 106 which is connected to the broadband wireless local area network controller (BWC) 114c.

In a representative embodiment of the present invention, voice and data traffic related to an existing active wireless call or connection for a subscriber may be routed from a serving wireless service provider such as, for example, the GSM network 114 to a broadband wired and/or a wireless LAN, and/or PAN using a broadband access gateway such as, for example, the gateway 118, so as to provide handoff. The broadband wired and/or a wireless LAN (WLAN), and/or PAN using a broadband access gateway may be located in a home, for example. Simulcasting is the simultaneous broadcasting of the same information over at least two different communication paths or channels. Accordingly, in a representative embodiment of the present invention, voice and data related traffic may be simulcasted to an access device and to the home broadband access gateway upon initiation of a call, in addition to receipt of a call from a calling party. In the former case where a calling party places a call to a called party, related voice and data for the called party and/or the calling party may be communicated to the broadband access gateway 118. When the calling party is at home, the calling party may use their access device or some other access device that is now serviced by the broadband access gateway 118 for further communication.

With reference to FIG. 1, the mobile access device 126 that may be, for example, a mobile multimedia handset, may initiate a call destined for the mobile access device 128 that may also be, for example, a mobile multimedia handset. Once the call is setup and established, the mobile access device 126 may be serviced by a cell site such as, for example, the cell site 114a located in the GSM network 114, while the mobile access device 128 may be serviced by a cell site such as, for example, the cell site 112a located in the CDMA network 112. While communication is active between the mobile access devices 126 and 128, the wireless carrier central office 114b may be configured to additionally route call-related traffic and data to the broadband access gateway (GW) 118 at the first location 102. In this regard, whenever the mobile access device 126 migrates from the service area of the GSM network 114 into a coverage area of the wireless interface 120 that is coupled to the broadband access gateway 118, the mobile access device 126 may be handed off from the serving cell site 114a and be serviced by the broadband access gateway 118.

In a representative embodiment of the present invention, a mobile access device such as, for example, the mobile access device 126 may send identification information to the broadband access gateway 118 upon entry into, or periodically while within the coverage area of the wireless interface 120. Such identification information may comprise, for example, an international mobile station identifier (IMSI), a mobile identification number (MIN), a media access control (MAC) address, an Internet protocol (IP) address, a digital certificate, a manufacturer identifier, a model identifier, a type identifier, and a service provider identifier, to name just a few such information items. In another representative embodiment of the present invention, a mobile subscriber or user may use their current mobile access device or another access device for communication while service is being offered by the broadband access gateway 118. In other words, the user is not limited to using the device that was in use during the handoff. Since the simulcasted call information is already available at the broadband access gateway 118, then handoff from the cell site 114a of the GSM network 114 to the broadband access gateway 118 may be more efficiently attained.

The broadband access gateway 118 may be adapted to inform the wireless carrier central office 114b that the mobile telephone 126 is currently within a coverage area of, and being serviced by, the broadband access gateway 118. As a result, the wireless carrier central office 114b may cease simulcasting information over the wireless path provided by the wireless service provider and the broadband access path to the first location 102. However, when the mobile access device migrates from within range of the broadband access gateway 118, and is being serviced by the wireless service provider, then the wireless carrier central office 114b may reinitiate simulcasting over the wireless path of the wireless service provider and the broadband access path.

In a representative embodiment of the present invention, there may be periods when service by the wireless path overlaps service offered by the broadband access path. In this regard, the service with the wireless service provider is not relinquished before handoff and service from the broadband access path is established. In a somewhat similar manner, in the opposite direction, service with the broadband access path is not relinquished before handoff and service from the wireless service provider is established. Although handoff from the wireless service provider to the broadband access network may occur seamlessly, handoff from the broadband access network access network may not, in all cases, occur seamlessly. For example, if there is a choice between two or more networks or network services, a user may prefer the flexibility of selecting which network best suit their needs. The handoff selection may be based on other criteria such as QoS, pricing and available features.

In another representative embodiment of the present invention, data resolution for multimedia information may be changed as roaming occurs from a first network to a second network. Multimedia information may comprise, for example, streaming video, broadcast video, voice, digital data, text, digitized audio, digitized still images, digitized video, and digitized music. The first network may be a wireless service provider network and the second network may be a broadband access network. Roaming may also occur between a mobile virtual network operator (MVNO) and the wireless service provider network and the broadband access network. Data resolution utilized for transmitting multimedia information between the various networks may be dynamically changed to facilitate more optimal communication between the mobile access devices and the various networks. Accordingly, as a mobile access device migrates from a first communication network to a second communication network, where the first communication network has less available bandwidth than the second communication network, then multimedia information, which could not have been previously delivered to the mobile access device, may now be delivered to the mobile access device. Alternatively, while the second communication network is servicing the mobile access device, multimedia information may now be delivered at a much higher resolution to the mobile access device.

A subscriber or user may also initiate a request to be handed off to a particular communication network. The request may provide media content detail options as well as network options such as bandwidth delivery options and pricing options. Billing options may also be provided. For example, when a user roams into the service area of a mobile virtual network operator (MVNO) which simulcasts multimedia information, available media content and corresponding billing information, as well as pricing, and delivery options may be provided to the user.

Figure 2:
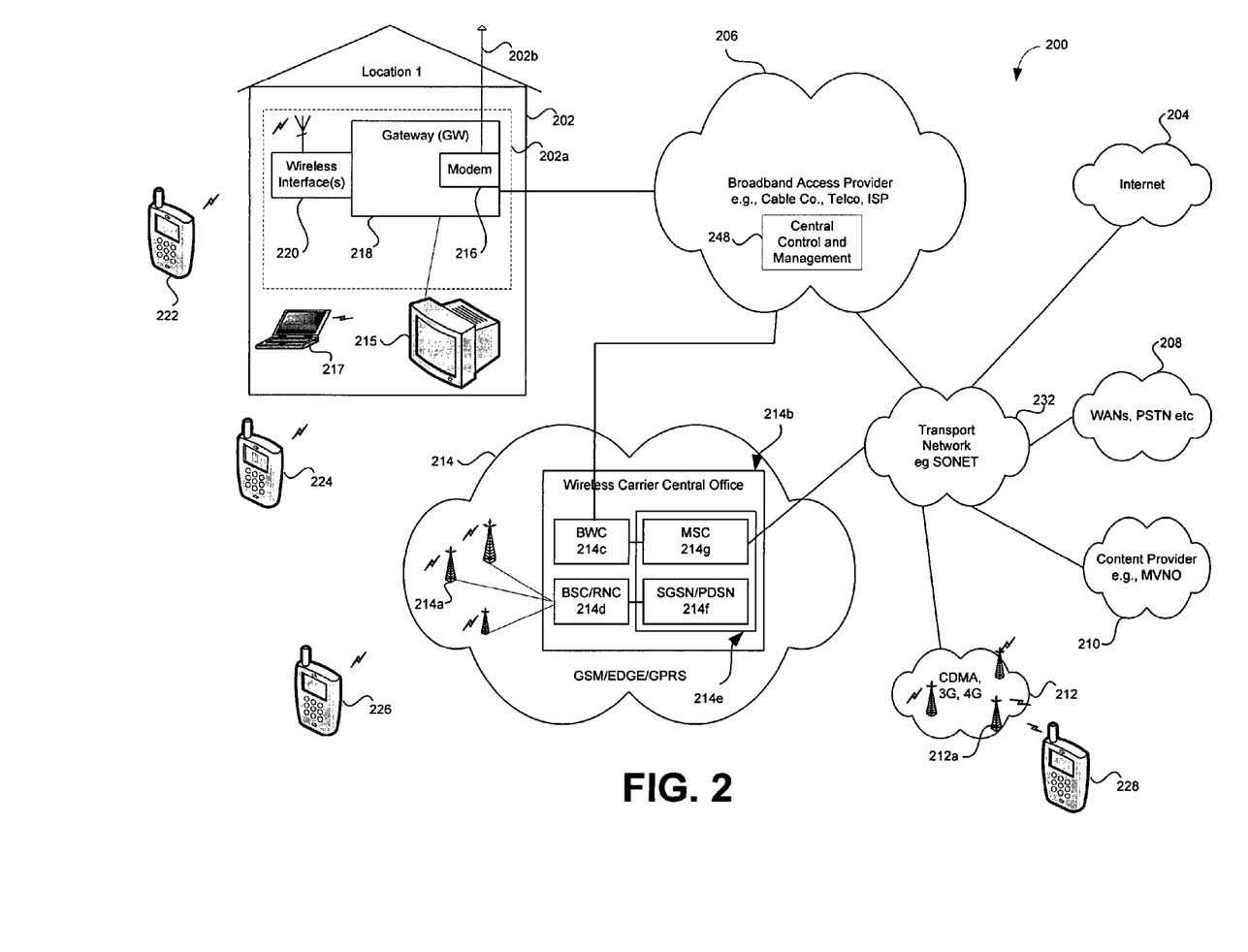
FIG. 2 shows a block diagram illustrating an exemplary communication system 100 that may be utilized for handoff through simulcasting of multimedia information, in accordance with a representative embodiment of the present invention.

FIG. 2 shows a block diagram illustrating an exemplary communication system 200 that may be utilized for handoff through simulcasting of multimedia information, in accordance with a representative embodiment of the present invention. The exemplary communication system 200 of FIG. 2 provides handoff through simulcasting for wireless network traffic, for an active subscriber, from a wireless service provider servicing the active subscriber to a broadband wired and/or a wireless LAN, and/or PAN using a broadband access gateway. Referring to FIG. 2, there is shown a first location 202, a broadband access provider (BAP) 206, a transport network block 232, an Internet 204, a WANs, PSTN, etc networks block 208, a content providers block 210, wireless service provider networks 212, 214, and a plurality of mobile access devices 222, 224, 226, 228 The wireless interface 220, the gateway 218 with modem 216, BAP 206, the GSM network 214, the transport network 232, and the CDMA network 236 of FIG. 2 may correspond, for example, to the wireless interface 120, the gateway 118 with modem 116, the BAP 106, the GSM network 114, the transport network 110, and the CDMA network 112, respectively, of FIG. 1. The illustration of FIG. 2 also comprises a central control and management block 248 that may correspond, for example, to the central control and management block 148 of FIG. 1.

The first location 202 comprises a broadband access gateway 218 with a modem 216, and a wireless interface 220. The first location may be a home, and the broadband access gateway 218 with the modem 216 and the wireless interface 220 may support a personal area network (PAN) and/or wireless local area network (WLAN), and may be referred to as a home network 202a. The wireless interface 220 may comprise a plurality of interfaces such as a Bluetooth interface, an IEEE 802.15.3a ultra-wideband interface, and any combination of IEEE 802.11 a, b, g and/or n interfaces. In a representative embodiment of the present invention, the gateway 218 may comprise, for example, a set top box that may be coupled in a wireless or wired fashion to access devices such as, for example, a laptop computer or television, such as the laptop 217 and the television 215 of FIG. 2. Service may be provided to the home network 202a supported by the gateway 218 via the cable modem 216, which is coupled to the broadband access provider 206.

The broadband access provider 206 may be, for example, a cable company, telephone company (Telco), or an Internet service provider (ISP). The broadband access provider 206 may utilize any of the standardized formats such as DOCSIS, digital subscriber line (DSL), or local multipoint distribution system (LMDS). LMDS utilizes broadband wireless technology to deliver voice, video, data, and/or Internet services utilizing licensed or unlicensed spectrum in the frequency range of 25-GHz and higher. LMDS utilizes point-to-point or point-to-multipoint communication to provide broadband services, some of which rely on line of sight (LOS). LMDS is a fixed wireless solution, and as such, no mobility support is required.

The broadband access provider 206 may be also be a WiMAX or Institute of Electronic and Electrical Engineers, Inc. (IEEE) 802.16-compliant service provider. The IEEE 802.16 standard offers a wireless metropolitan area network (MAN) air interface which provides network access to buildings via external antennas that receive signals from a remotely located central base station. The signal received at the building may be communicated to a wired network infrastructure such as an IEEE 802.3 compliant communication network or a wireless network infrastructure such as an IEEE 802.11a/b/g and/or n-compliant network. In instances where WiMAX is utilized, then antenna 202b may be utilized to receive and transmit signals between the broadband access provider 206 and the home network 202a.

The WANs, PSTN, etc networks block 208 may comprise networks such as private or public communication networks. For example, the WANs, PSTN, etc networks block 208 may comprise a public switched telephone network (PSTN) and a packet network such as a cellular digital packet data (CDPD) network.

The content providers block 210 may comprise network providers, which supply data and/or multimedia content. In a representative embodiment of the present invention, the content providers block 210 may comprise one or more mobile virtual network operators (MVNOs). A MVNO is a mobile service provider that provides mobile services to its subscribers by utilizing the network infrastructure of another company. In this regard, the MVNO enters into an agreement with a network operator to purchase network time such as minutes, which it resells to it own customers/subscribers. The MNVO utilizes the purchased time to provide, for example, multimedia content delivery to its subscribers.

The wireless service provider network 212 may, for example, utilize CDMA, 3G or 4G access technology and may comprise a plurality of cell sites. Cell site 212a may provide cellular service to mobile access device 228 while the mobile access device 228 is within range of the cell site 212a. The wireless service provider network 214 may, for example, utilize the time division multiple access (TDMA) access technology of the GSM standard, and may include enhanced data rates for GSM evolution (EDGE) and/or general packet radio service (GPRS) data capability. The wireless service provider network 214 may comprise a plurality of cell cites and a wireless carrier central office 214b, the latter of which comprises a mobile switching center (MSC) 214g. Cell site 214a may provide cellular service to mobile access device 226 while the mobile access device 226 is within range of the cell site 214a.

With reference to FIG. 2, the mobile access device 226 that may comprise, for example, a mobile multimedia handset may initiate a call destined for the mobile access device 228, which may be, for example, another mobile multimedia handset. Once the call is setup and established, the mobile access device 226 may be serviced by cell site 214a located in the GSM/EDGE/GPRS network 214, while the mobile access device 228 may be serviced by cell site 212a located in the CDMA network 212. While communication is active between the mobile access devices 226 and 228, the wireless carrier central office 214b may be configured to additionally route call related traffic and data to the broadband access gateway (GW) 218 at the first location 202. In this regard, whenever the mobile access device 226 migrates from the service area of the GSM/EDGE/GPRS network 214 into a coverage area of the wireless interface 220 that is coupled to the broadband access gateway 218, the mobile access device 226 may be handed off from the serving cell site 214a and be serviced by the broadband access gateway 218.

In another representative embodiment of the present invention, a mobile subscriber or user may utilize their current mobile access device or another access device for communication while service is being provided by the broadband access gateway 218. Since the simulcasted call information including call parameters is already available at the broadband access gateway 218, then handoff from the wireless service provider cell site 214a to the broadband access gateway 218 may be more efficiently attained. In this regard, there is no need to utilize additional system resources to transfer these call parameters to the broadband access gateway 218 residing in the home network.

Figure 3:
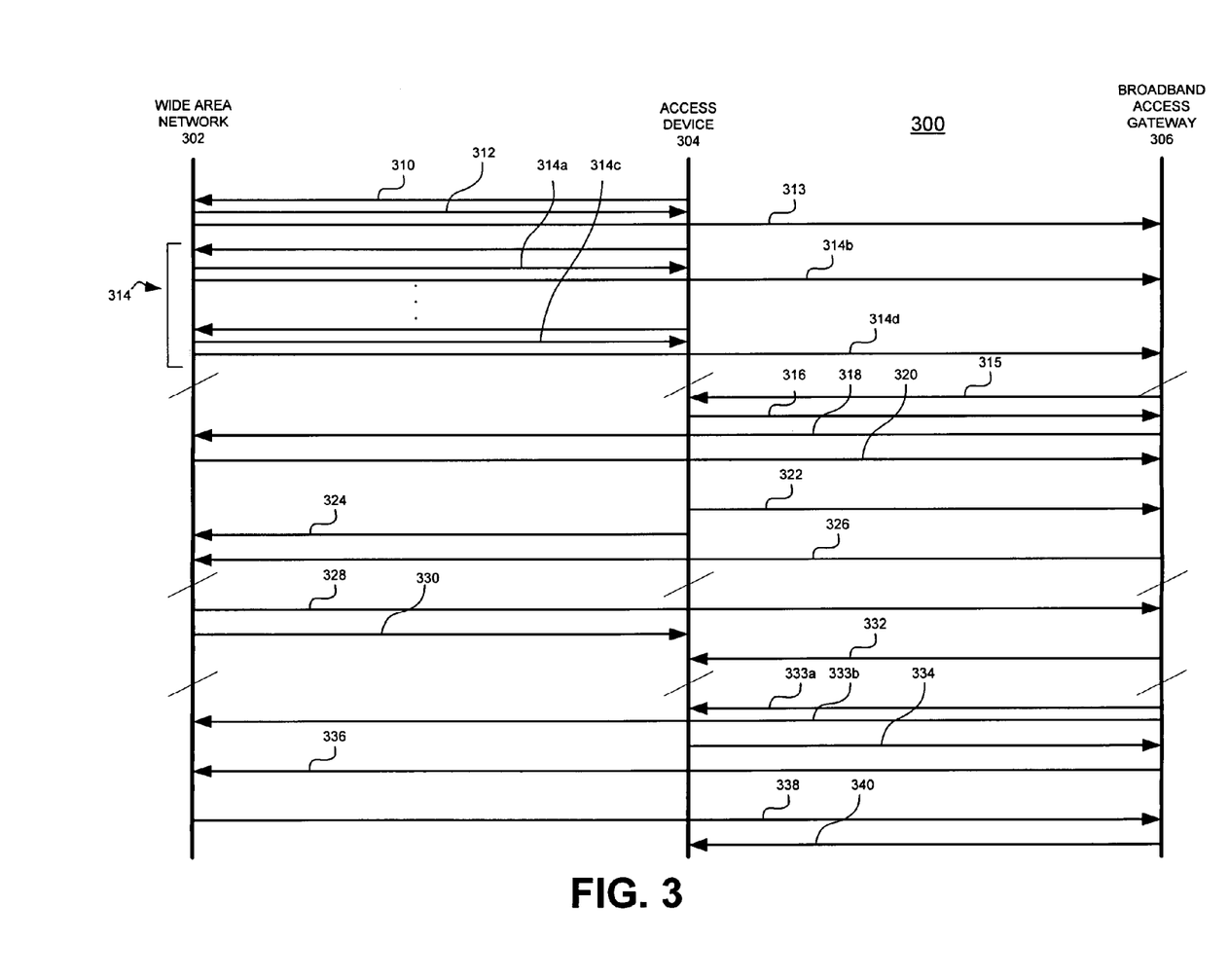
FIG. 3 is a message exchange diagram illustrating exemplary messaging during migration of an access device such as, for example, the access device of FIG. 2 between a wide area network such as, for example, the GSM/EDGE/GPRS network, and the personal area/wireless local area network of a broadband access gateway such as, for example, the wireless interface of the gateway 218 of FIG. 2, in accordance with a representative embodiment of the present invention.

FIG. 3 is a message exchange diagram 300 illustrating exemplary messaging during migration of an access device such as, for example, the access device 224 of FIG. 2 between a wide area network such as, for example, the GSM/EDGE/GPRS network 214, and the personal area network/wireless local area network of a broadband access gateway such as, for example, the wireless interface 220 of the gateway 218 of FIG. 2, in accordance with a representative embodiment of the present invention. In the illustration of FIG. 3, the three vertical lines represent a wireless wide area network 302, an access device 304, and a broadband access gateway 306 that may correspond, for example, to the GSM/EDGE/GPRS network 214, the access device 224, and the gateway 218, respectively, of FIG. 2. The horizontal lines represent messages or groups of messages exchanged between a source and a destination, the destination being indicated by the arrow head. The vertical dimension represents time, advancing downward on the message exchange diagram 300.

In a representative embodiment of the present invention, an access device 304 may initiate or receive a call via the wireless wide area network 302 using messaging 310, 312. The messaging 310, 312 may establish a wireless call on the wireless wide area network 302. At the time that the call is established, the wireless wide area network 302 may determine that the access device 304 has an associated broadband access gateway 306, and may inform the broadband access gateway 306 of the simulcast call using messaging 313. The call traffic is shown in FIG. 3 as a sequence of messaging 314 between the access device 304 and the wide area network 302. This exchange may, for example, transfer multimedia information such as digitized voice, streaming video, broadcast video, digitized video, still images, data, and text, as previously described. Note that during the sequence of messaging 314, the wide area network simultaneously broadcasts (i.e., simulcasts) messages via the wide area network and the broadband network by transmitting a message to the access device 304 as wireless messaging 314a, 314c via the wireless wide area network, and a copy to the broadband access gateway 306 as messaging 314b, 314d, respectively, via the broadband network.

Subsequent to receiving the messaging 313, the broadband access gateway 306 may offer the call comprising the sequence of messaging 314 to any available access devices within the coverage area of the personal area/wireless local area network supported by the broadband access gateway 306 using messaging 315. The access device 304 may then accept the call by sending messaging 316. The broadband access gateway 306 may inform the wireless wide area network 302 of the acceptance of the call through the broadband access gateway 306 using messaging 318, and the wireless wide area network 302 may acknowledge with messaging 320. The access device 304 may then send a copy of the call traffic messaging 324 to the broadband access gateway 306 as messaging 322. The messaging 322 may be forwarded to the wireless wide area network 302 via a broadband network as messaging 326. The call traffic messaging from the wireless wide area network 302 destined for the access device 304 is sent both via the wireless wide area network 302 and to the broadband access gateway 306 as messaging 328. The messaging 328 may be forwarded by the broadband access gateway 306 to the access device 304 as messaging 332.

At some later point in time, the broadband access gateway 306 may notify the access device 304 via messaging 333a and wireless wide area network 302 via messaging 333b, that simulcasting is no longer desired and/or necessary. Thereafter, the access device 304 may send call traffic only to the broadband access gateway 306 as messaging 334, which is forwarded to the wireless wide area network 302 as messaging 336. In the reverse direction, the wireless wide area network 302 may send call traffic for the access device 304 only to the broadband access gateway 306 as messaging 338, which is forwarded by the broadband access gateway 306 via the personal area network/wireless local area network, to the access device 304 as messaging 340. The above discussion is only by way of example, and does not represent limitations of the present invention. Other message exchanges and arrangements are contemplated and may be employed without departing from the spirit and scope of the present invention.

Figure 4:
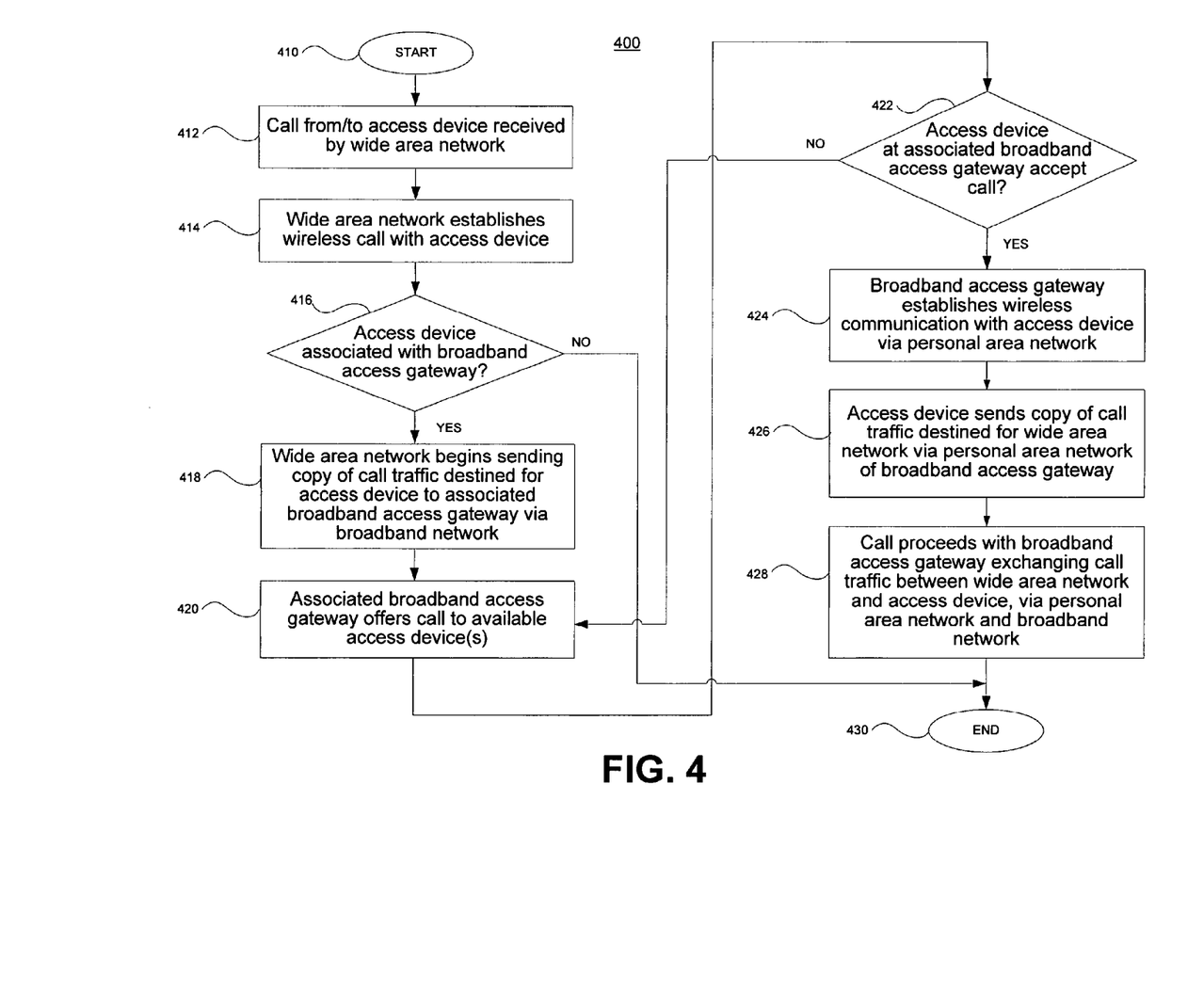
FIG. 4 is a flowchart of an exemplary method supporting handoff through simulcasting of multimedia information, in accordance with a representative embodiment of the present invention.

FIG. 4 is a flowchart 400 of an exemplary method supporting handoff through simulcasting of multimedia information, in accordance with a representative embodiment of the present invention. The following discussion makes references to the elements of FIG. 2. The method of FIG. 4 begins with an access device such as, for example, the access device 224 in an idle state (i.e., not engaged in a call) (block 410). A call destined for or placed by the access device 224 is then received by a wireless wide area network such as, for example, the GSM/EDGE/GPRS network 214 (block 412). The access device 224 may comprise, for example, a mobile multimedia handset, a wireless personal digital assistant, or other similar device. The wireless wide area network 214 may then establish a wireless call with the access device 224 (block 414). During the setup of the call, the wireless wide area network 214 may determine whether the access device 224 is associated with a broadband access gateway such as, for example, the gateway 218 (block 416). If the access device is not associated with a broadband access gateway, the method of FIG. 4 ends (block 430). If, however, the wireless wide area network 214 determines that the access device 224 has an associated broadband access gateway, the wireless wide area network 214 may begin sending a copy of call traffic destined for the access device 224 to the associated broadband access gateway via a broadband network (block 418). The broadband network may comprise, for example, a digital subscriber line (DSL) network, a satellite network, a cable network, a T1 or T3 network, a local multipoint distribution system (LMDS), an IEEE 802.11 a/b/g/n network, and a WiMAX or IEEE 801.16 network, to name only a few. The associated broadband access gateway may then begin offering the call traffic to any of the access devices within the coverage area of the personal area network/wireless local area network supported by the associated broadband access gateway (block 420).

In a representative embodiment of the present invention, it may be determined that no access device accepts the call offered by the broadband access gateway (block 422). The broadband access gateway may then continue to offer the call (block 420). If, however, an access device within the coverage area of the associated broadband access gateway accepts the call (block 422), the associated broadband access gateway establishes wireless communication with the accepting access device via the personal area network/wireless local area network (block 424). The access device may then begin sending a copy of all call traffic destined for the wireless wide area network via the personal area network/wireless local area network supported by the broadband access gateway (426). The call may then proceed until terminated by the user of the access device, with the broadband access gateway exchanging call traffic between the wireless wide area network and the access device via the personal area network/wireless local area network of the broadband access gateway, and the broadband network (block 428). The method of FIG. 4 then ends (block 430).

Aspects of the present invention may be found in a method of operating a broadband access gateway supporting handoff of at least one access device between a wide area network and one of a personal area network and a wireless local area network using simulcasting of multimedia information. Such a method may comprise associating the at least one access device with the broadband access gateway, and receiving, from the wide area network via a broadband network, multimedia information simultaneously sent wirelessly directly from the wide area network to the associated at least one access device. The method may also comprise sending multimedia information received via the broadband network to the associated at least one access device via the one of a personal area network and a wireless local area network. In a representative embodiment of the present invention, the method may comprise receiving multimedia information from the associated at least one access device via the one of a personal area network and a wireless local area network, and transmitting the multimedia information received from the associated at least one access device to the wide area network via the broadband network. In a representative embodiment of the present invention, the at least one access device may comprise at least one of a mobile multimedia handset, a personal digital assistant (PDA), a personal computer (PC), a computer peripheral, a digital scanner, a digital camera, a printer, headphones, and a pointing device. The wide area network may comprise at least one of a cellular digital packet data (CDPD) network, a public switched telephone network (PSTN), a Global System for Mobile Communication (GSM) network, and a General Packet Radio Service (GPRS) network. The wide area network may also comprise a short message service (SMS) network, a GSM enhanced data rates for global evolution (EDGE) network, a time division multiple access (TDMA) network, an integrated digital enhanced network (iDEN), a code division multiple access (CDMA) network, and a CDMA2000 1xRTT network.

In a representative embodiment in accordance with the present invention, the personal area network may comprise at least one of a Bluetooth network, an IEEE 802.15.3a ultra-wideband network, and an Institute of Electrical and Electronics Engineers (IEEE) 802.11 a, b, g, and n network. The broadband network may comprise at least one of a cable network, a digital subscriber loop network, a T1 network, a T3 network, a local multipoint distribution system (LMDS), a WiMAX network, and an Institute of Electrical and Electronics Engineers (IEEE) 802.16 network. The multimedia information may comprise at least one of streaming video, broadcast video, voice, digital data, text, digitized audio, digitized still images, digitized video, and digitized music. A method in accordance with a representative embodiment of the present invention may also comprise receiving, via the one of a personal area network and a wireless local area network, acceptance of the received multimedia information by the associated at least one access device. In addition, the method may comprise informing the wide area network via the broadband network, of acceptance of multimedia information by the associated at least one access device via the one of a personal area network and a wireless local area network.

Additional aspects of the present invention may be seen in a system supporting handoff of at least one access device between a wide area network and one of a personal area network and a wireless local area network using simulcasting of multimedia information. Such a system may comprise a gateway communicatively coupled to a broadband network and at least one wireless interface, the gateway capable of selectively exchanging multimedia information between the at least one wireless interface and the broadband network, and of communicating with the at least one access device via the at least one wireless interface. In a representative embodiment of the present invention, the gateway may be capable of associating the at least one access device with the broadband access gateway. The gateway may also be capable of receiving, from the wide area network via a broadband network, multimedia information simultaneously sent wirelessly directly from the wide area network to the associated at least one access device. The gateway may be capable of sending multimedia information received via the broadband network to the associated at least one access device via the at least one wireless interface, and of receiving multimedia information from the associated at least one access device via the at least one wireless interface. In addition, the gateway may be capable of transmitting the multimedia information received from the associated at least one access device to the wide area network via the broadband network.

In a representative embodiment of the present invention, the multimedia information may comprise at least one of streaming video, broadcast video, voice, digital data, text, digitized audio, digitized still images, digitized video, and digitized music. The wide area network may comprise at least one of a cellular digital packet data (CDPD) network, a public switched telephone network (PSTN), a Global System for Mobile Communication (GSM) network, and a General Packet Radio Service (GPRS) network. The wide area network may also comprise a short message service (SMS) network, a GSM enhanced data rates for global evolution (EDGE) network, a time division multiple access (TDMA) network, an integrated digital enhanced network (iDEN), a code division multiple access (CDMA) network, and a CDMA2000 1xRTT network. The at least one wireless interface may comprise at least one of a Bluetooth network interface and an IEEE 802.15.3a ultra-wideband network interface, and the at least one wireless interface may be compliant with at least one of an Institute of Electrical and Electronics Engineers (IEEE) 802.11 a, b, g, and n network interface standard. In various representative embodiments of the present invention, the broadband network may comprise at least one of a cable network, a digital subscriber loop network, a T1 network, a T3 network, a local multipoint distribution system (LMDS), a WiMAX network, and an Institute of Electrical and Electronics Engineers (IEEE) 802.16 network.

In a representative embodiment of the present invention, the multimedia information may comprise at least one of streaming video, broadcast video, voice, digital data, text, digitized audio, digitized still images, digitized video, and digitized music. The gateway may be capable of receiving, via the at least one wireless interface, acceptance of the received multimedia information by the associated at least one access device, and of informing the wide area network via the broadband network, of acceptance of multimedia information by the associated at least one access device via the at least one wireless interface. The at least one access device may comprise at least one of a mobile multimedia handset, a personal digital assistant (PDA), a personal computer (PC), a computer peripheral, a digital scanner, a digital camera, a printer, headphones, and a pointing device.

Yet other aspects of the present invention may be observed in a broadband access gateway apparatus supporting handoff using simulcasting of multimedia information. The apparatus may comprise at least one wireless interface supporting communication via at least one of a personal area network and a wireless local area network, and at least one network interface for communication via a broadband network. The apparatus may comprise at least one processor capable of associating at least one access device with the broadband access gateway apparatus, and the at least one processor may be communicatively coupled to the at least one wireless interface and the at least one network interface. The at least one processor may be capable of receiving, via the broadband network, multimedia information simultaneously communicated wirelessly to the associated at least one access device via a wide area network, and of transmitting the received multimedia information to the associated at least one access device via the at least one wireless local area network. The at least one processor may also be capable of detecting acceptance of the transmitted multimedia information, and of communicating acceptance of the transmitted multimedia information to the wide area network via the broadband network. The at least one wireless interface may comprise at least one of a Bluetooth network interface and an IEEE 802.15.3a ultra-wideband network interface, and may comprise at least one of an Institute of Electrical and Electronics Engineers (IEEE) 802.11 a, b, g, and n network interface. In various representative embodiments of the present invention, the broadband network may comprise at least one of a cable network, a digital subscriber loop network, a T1 network, a T3 network, a local multipoint distribution system (LMDS), a WiMAX network, and an Institute of Electrical and Electronics Engineers (IEEE) 802.16 network.

The at least one access device in a representative embodiment of the present invention may comprise at least one of a mobile multimedia handset, a personal digital assistant (PDA), a personal computer (PC), a computer peripheral, a digital scanner, a digital camera, a printer, headphones, and a pointing device. The multimedia information may comprise at least one of streaming video, broadcast video, voice, digital data, text, digitized audio, digitized still images, digitized video, and digitized music. The wide area network in a representative embodiment of the present invention may comprise at least one of a cellular digital packet data (CDPD) network, a public switched telephone network (PSTN), a Global System for Mobile Communication (GSM) network, and a General Packet Radio Service (GPRS) network. The wide area network may also comprise a short message service (SMS) network, a GSM enhanced data rates for global evolution (EDGE) network, a time division multiple access (TDMA) network, an integrated digital enhanced network (iDEN), a code division multiple access (CDMA) network, and a CDMA2000 1xRTT network. In addition, the at least one processor may be capable of receiving, via the at least one wireless interface, multimedia information simultaneously transmitted by the associated at least one access device via the wide area network.

In a representative embodiment of the present invention, the wireless local area networks may include data networks such as, for example, Institute of Electrical and Electronics Engineer (IEEE) 802.11 a/b/g/n compliant wireless networks such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1xRT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineer (IEEE) 802.15.3a compliant wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are important because all the information coming into and leaving the home from either the WAN side (i.e., the broadband connection side), or from the PAN side (i.e., the access device side) converges at the gateway. The PAN side may comprise Bluetooth, wireless LAN (IEEE 802.11 a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of operating a gateway device supporting handoff of at least one access device between a wide area network and one of: a personal area network and a wireless local area network using simulcasting of multimedia information, the method comprising:

receiving, from the wide area network via a broadband network, multimedia information sent wirelessly from the wide area network to the at least one access device;

sending multimedia information received at the gateway device via the broadband network to the at least one access device via the one of: the personal area network and the wireless local area network;

receiving simulcast call information from the at least one access device via the one of: the personal area network and the wireless local area network;

determining that the access device is currently within range of the one of: the personal area network and the wireless local area network, and in response initiating discontinuation of simulcasting between the wide area network and the at least one access device by transmitting a message to the at least one access device and the wide area network; and determining that the access device has migrated out of range of the one of: the personal area network and the wireless local area network, and in response reinitiating simulcasting between the wide area network and the at least one access device by transmitting a message to the at least one mobile access device and the wide area network, wherein the gateway device is arranged to be locally coupled to the one of the personal area network or the wireless local area network and communicatively coupled to the wireless wide area network via the broadband network.

2. The method according to claim 1, wherein the at least one access device comprises at least one of: a mobile multimedia handset, a computer peripheral, a digital scanner, a digital camera, a printer, headphones, and a pointing device.

3. The method according to claim 1, wherein the personal area network comprises at least an IEEE 802.15.3a ultra-wideband network.

4. The method according to claim 1, wherein the broadband network comprises at least one of: a digital subscriber loop network, a T1 network, a T3 network, a local multipoint distribution system (LMDS), a WiMAX network, and an Institute of Electrical and Electronics Engineers (IEEE) 802.16 network.

5. The method according to claim 1, further comprising:
receiving, via the one of: the personal area network and the wireless local area network, acceptance of the multimedia information by the at least one access device.

6. The method according to claim 1, wherein the gateway device begins receiving the simulcast call information from the wide area network upon establishment of direct wireless call communication between the at least one access device and the wide area network, if the wide area network determines that the at least one access device has an associated gateway device.

7. A system supporting handoff of at least one access device between a wide area network and one of: a personal area network and a wireless local area network using simulcasting of multimedia information, the system comprising:

a gateway device communicatively coupled to the wide area network via a broadband network and locally coupled to the one of the of: the personal area network and the wireless local area network via at least one wireless interface, the gateway device being capable of selectively communicating multimedia information between the at least one wireless interface and the broadband network, and of communicating with the at least one access device via the one of: the personal area network and the wireless local area network via the at least one wireless interface;

the gateway device being configured to receive, from the wide area network via a broadband network, multimedia information simultaneously sent wirelessly directly from the wide area network to the associated at least one access device;

the gateway device being configured to send multimedia information received at the gateway device via the broadband network to the associated at least one access device via the at least one wireless interface;

the gateway device being configured to receive simulcast call information from the wide area network;

the gateway device being configured to determine that the access device is currently within range of the one of: the personal area network and the wireless local area network, and in response initiate discontinuation of simulcasting between the wide area network and the at least one access device by transmitting a message to the at least one mobile access device and the wide area network; and the gateway device being configured to determine that the access device has migrated out of range of the one of: the personal area network and the wireless local area network, and in response reinitiate simulcasting between the wide area network and the at least one access device by transmitting a message to the at least one mobile access device and the wide area network.

8. The system according to claim 7, further comprising: the gateway capable of receiving, via the at least one wireless interface, acceptance of the multimedia information by the at least one access device.

9. The system according to claim 7, further comprising: the gateway capable of informing the wide area network, via the broadband network, of acceptance of multimedia information by the at least one access device via the at least one wireless interface.

10. The system according to claim 7, wherein the gateway device begins receiving the simulcast call information from the wide area network upon establishment of direct wireless call communication between the at least one access device and the wide area network, if the wide area network determines that the at least one access device has an associated gateway device.

11. The system according to claim 7, wherein determining that the at least one access device has an associated gateway device is based upon information received directly from the at least one access device by the wide area network at call establishment.

12. A gateway device supporting handoff using simulcasting of multimedia information, the gateway device comprising:

at least one wireless interface supporting communication via at least one of: a personal area network and a wireless local area network;

at least one network interface for communication via a broadband network;

at least one processor configured to receive, at the gateway device from a wide area network via the broadband network, multimedia information of a call for the at least one access device, the multimedia information of a call being simulcast communication by the wide area network;

the at least one processor being configured to transmit the received multimedia information to the at least one access device via the at least one wireless interface;

the at least one processor being configured to determine that the access device is currently within range of the at least one of: the personal area network and the wireless local area network, and in response initiate discontinuation of simulcasting between the wide area network and the at least one access device by transmitting a message to the at least one mobile access device and the wide area network; and the at least one processor being configured to determine that the access device has migrated out of range of the at least one of: the personal area network and the wireless local area network, and in response reinitiate simulcasting between the wide area network and the at least one access device by transmitting a message to the at least one mobile access device and the wide area network, wherein the gateway device is arranged to be locally coupled to the at least one of the personal area network or the wireless local area network and communicatively coupled to the wireless wide area network via the broadband network.

13. The gateway device according to claim 12, further comprising: the at least one processor capable of detecting acceptance of the multimedia information.

14. The gateway device according to claim 12, further comprising: the at least one processor capable of gateway device acceptance of the multimedia information to the wide area network via the broadband network.

15. The gateway device according to claim 12, wherein the at least one access device comprises at least one of: a mobile multimedia handset, a computer peripheral, a digital scanner, a digital camera, a printer, headphones, and a pointing device.

16. The gateway device according to claim 12, further comprising: the at least one processor capable of receiving, via the at least one wireless interface, multimedia information simultaneously transmitted by the at least one access device via the wide area network.

17. The gateway device according to claim 12, wherein the at least one processor begins receiving the multimedia information from the wide area network upon establishment of direct wireless call communication between the at least one access device and the wide area network, if the wide area network determines that the at least one access device has an associated gateway device.

18. The gateway device according to claim 12, wherein the gateway device begins receiving the multimedia information from the wide area network upon establishment of direct wireless call communication between the at least one access device and the wide area network, if the wide area network determines that the at least one access device has an associated gateway device.

19. The gateway device according to claim 18, wherein determining that the at least one access device has an associated gateway device is based upon information received directly from the at least one access device by the wide area network at call establishment.

20. The gateway device according to claim 12, wherein the at least one processor is configured to receive call traffic messaging and forward the call traffic messaging to the wide area network through the broadband network.

* * * * *